US010859499B2

(12) United States Patent
Lee et al.

(10) Patent No.: US 10,859,499 B2
(45) Date of Patent: Dec. 8, 2020

(54) APPARATUS AND METHOD FOR QUANTITATIVE MOLECULAR SENSING BASED ON RAMAN PEAK SHIFT

(71) Applicants: SAMSUNG ELECTRONICS CO., LTD., Suwon-si (KR); CALIFORNIA INSTITUTE OF TECHNOLOGY, Pasadena, CA (US)

(72) Inventors: Jeongoen Lee, Pasadena, CA (US); Daejong Yang, Pasadena, CA (US); Youngzoon Yoon, Hwaseong-si (KR); Hyuck Choo, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 273 days.

(21) Appl. No.: 15/986,246

(22) Filed: May 22, 2018

(65) Prior Publication Data
US 2018/0335387 A1 Nov. 22, 2018

Related U.S. Application Data

(60) Provisional application No. 62/509,480, filed on May 22, 2017.

(51) Int. Cl.
*G01N 21/65* (2006.01)
(52) U.S. Cl.
CPC ..... *G01N 21/658* (2013.01); *G01N 2201/123* (2013.01); *G01N 2201/129* (2013.01)
(58) Field of Classification Search
CPC ........... G01N 21/658; G01N 2201/129; G01N 2201/123
See application file for complete search history.

(56) References Cited

U.S. PATENT DOCUMENTS 6,615,142 B1 * 9/2003 Hovde ................. G06F 17/10
702/30
2007/0004975 A1 1/2007 Zribi et al.
(Continued)

FOREIGN PATENT DOCUMENTS

KR 10-2018-0129683 A 12/2018

OTHER PUBLICATIONS

Shuangshuang Li et al., "Surface-enhanced Raman Scattering Behaviours of 4-Mercaptophenyl boronic Acid on Assembled Silver Nanoparticles", Physical Chemistry Chemical Physics, Royal Society of Chemistry, Issue 27, Jun. 3, 2015, pp. 1-8 (9 total pages).

(Continued)

*Primary Examiner* — Jennifer Wecker
*Assistant Examiner* — Michael Paul Shimek
(74) *Attorney, Agent, or Firm* — Sughrue Mion, PLLC

(57) ABSTRACT

An apparatus and method for quantitatively sensing and analyzing a concentration of biomolecules using Raman peak shift are disclosed. The quantitative molecular sensing apparatus includes an illumination optical system including a light source configured to irradiate excitation light onto an object, a detection optical system including an optical detector configured to detect light scattered from the object, and a signal processor configured to analyze properties of the object based on signal output by the detection optical system and to calculate a concentration of target molecules in the object based on a Raman peak shift value over a predetermined time period.

24 Claims, 18 Drawing Sheets

(56) References Cited

U.S. PATENT DOCUMENTS

| | | | |
|---|---|---|---|
| 2007/0060806 A1 | 3/2007 | Hunter et al. | |
| 2009/0014340 A1 | 1/2009 | Williams et al. | |
| 2009/0213369 A1* | 8/2009 | Lee | B82Y 15/00 356/301 |
| 2010/0268473 A1* | 10/2010 | Tripp | G01N 21/658 702/19 |
| 2011/0188033 A1* | 8/2011 | Hu | G01J 3/44 356/301 |
| 2015/0338348 A1* | 11/2015 | Schultz | G01N 21/658 356/301 |
| 2017/0130186 A1* | 5/2017 | Berry | C12M 41/48 |
| 2018/0340830 A1 | 11/2018 | Yang et al. | |

OTHER PUBLICATIONS

Kien Voon Kong et al., "Sensitive SERS Glucose Sensing in Biological Media Using Alkyne Functionalized Boronic acid on Planar Substrates", Biosensors and Bioelectonics, vol. 6, Jun. 15, 2014, pp. 1-18 (18 pages total).

Xiangcheng Sun et al., "Functionalized aligned silver nanorod arrays for glucose sensing through surface enhanced Raman scattering", The Royal Society of Chemistry, Jun. 2, 2014, 4, pp. 23382-23388 (8 pages total).

Olga Lyandres et al., "Real-Time Glucose Sensing by Surface-Enhanced Raman Spectroscopy in Bovine Plasma Facilitated by a Mixed Decanethiol/Mercaptohexanol Partition Layer", Analytical Chemistry, Oct. 1, 2015, vol. 77, No. 19, pp. 6134-6139 (6 pages total).

Bhavya Sharma et al., "Bisboronic Acids for Selective, Physiologically Relevant Direct Glucose Sensing with Surface-Enhanced Raman Spectroscopy", Journal of the American Chemical Society, Sep. 26, 2016, pp. 13952-13959 (8 pages total).

Anonymous, "IDF Diabetes Atlas", International Diabetes Foundation, 2015, 7th edition; pp. 5-142 (140 total pages).

Zachary T. Bloomgarden, "Diabetes Complications", Diabetes Care, Jun. 2004, vol. 27, No. 6, pp. 1506-1514 (9 pages total).

Hilal Torul et al., "Glucose determination based on two component self-assembled monolayer functionalized surface-enhanced Raman spectroscopy (SERS) probe", Analytical Methods, The Royal Society of Chemistry, Issue 14, May 6, 2014, pp. 1-16 (17 total pages).

Jeffrey N. Anker et al., "Biosensing with plasmonic nanosensors", Nature Materials, Jun. 2008, vol. 7, pp. 442-453 (13 pages total).

Andreas B. Dahlin et al., "Improving the Instrumental Resolution of Sensors Based on Localized Surface Plasmon Resonance", Analytical Chemistry, Jul. 1, 2006, vol. 78, No. 13, pp. 4416-4423 (8 pages total).

Phillip Barak, "Smoothing and Differentiation by an Adaptive-Degree Polynomial Filter", Analytical Chemistry, Sep. 1, 1995, vol. 67, No. 17, pp. 2758-2762 (5 pages total).

Kun Chen et al., "Improved Savitzky—Golay-method-based fluorescence subtraction algorithm for rapid recovery of Raman spectra", Applied Optics, Aug. 20, 2014, vol. 53, No. 24, pp. 5559-5569 (12 pages total).

Andrzej Kwiatkowski et al., "Algorithms of Chemicals Detection Using Raman Spectra", Metrology and Measurement Systems, Nov. 26, 2010, vol. XVII, No. 4, pp. 549-560 (11 pages total).

Alankar Shrivastava and Vipin B. Gupta, "Methods for the determination of limit of detection and limit of quantitation of the analytical methods", Chronicles of Young Scientists, Jan. 2011, vol. 2, Issue 1, pp. 21-25 (5 pages total).

* cited by examiner

APPARATUS AND METHOD FOR QUANTITATIVE MOLECULAR SENSING BASED ON RAMAN PEAK SHIFT

CROSS-REFERENCE TO RELATED APPLICATION

This application claims the benefit of US Provisional Application No. 62/509,480, filed on May 22, 2017, in the United States Patent and Trademark Office, the disclosure of which is incorporated herein in its entirety by reference.

BACKGROUND

1. Field

Apparatuses and methods consistent with exemplary embodiments relate to quantitative molecular sensing, and more particularly, to an apparatus and method for quantitatively sensing and analyzing the concentration of biomolecules of various substances, such as glucose, by using surface enhanced Raman peak shift.

2. Description of the Related Art

Raman spectroscopy is used to perform component analysis on various materials by measuring inelastic scattering occurring in an object upon irradiation of the object with excitation light. When light is incident onto a sample to be measured, light scattered inelastically at a wavelength different from that of the incident light is detected and measured. The wavelength shift between the incident light and the scattered light is referred to as Raman shift. The Raman shift represents a state of vibration or rotation energy of molecules. The intensity of Raman-scattered light is known to directly correspond to the concentration of target molecules, and accordingly, molecular analysis using Raman spectroscopy is widely used.

Particularly, with the development of Surface-Enhanced Raman Scattering (SERS) by which a Raman signal of molecules absorbed by a metal substrate roughly surface-processed increases greatly, the disadvantage of typical Raman Spectroscopy, having low detection sensitivity due to very small signal intensity of Raman-scattered light, has been addressed. Many studies for establishing the principle of SERS are underway. For example, it is predicted that in the case of a laser irradiated onto a metal, surface plasmons are excited intensively in a specific area according to the surface structure of the metal, thereby causing SERS. Also, the electromagnetic interaction between molecules absorbed by the metal and the metal is predicted to contribute to SERS.

Trials for measuring a concentration of biomolecules in a sample using SERS have been conducted. For example, a trial for quantitatively measuring the glucose concentration in blood based on the intensity of a Raman-scattered signal has been conducted.

SUMMARY

Exemplary aspects and advantages will be set forth in part in the description which follows and, in part, will be apparent from the description, or may be learned by practice of the presented exemplary embodiments.

According to an aspect of an exemplary embodiment, a quantitative molecular sensing apparatus includes: an illumination optical system including a light source for irradiating excitation light onto an object; a detection optical system including an optical detector for detecting light scattered from the object; and a signal processor configured to analyze properties of the object using a signal output by the detection optical system, wherein the signal processor is configured to calculate a concentration of target molecules in the object based on a Raman peak shift value over a predetermined time period.

The quantitative molecular sensing apparatus may further include a Raman scattering substrate on which the object is supportable.

The Raman scattering substrate may comprise a surface enhanced Raman scattering substrate.

The Raman scattering substrate may include: a support layer; a plurality of metal nanoparticle clusters arranged on the support layer; a plurality of holes disposed among the plurality of metal nanoparticle clusters, wherein the plurality of holes are configured to transmit light, incident on a top of the Raman scattering substrate, toward the support layer.

Each metal nanoparticle cluster may include a plurality of conductive metal nanoparticles stacked in a 3-dimensional structure.

A plurality of linker molecules may be fixed on a surface of the Raman scattering substrate, and the linker molecules may be configured to bind with the target molecules in the object.

The plurality of holes may perforate among the plurality of metal nanoparticle clusters to enable light to be incident on a surface of the support layer.

The signal processor may configured to obtain a plurality of Raman spectra at regular time intervals based on the signal output by the detection optical system, and to process the plurality of Raman spectra using at least one signal processing technique.

The at least one signal processing technique may comprise applying a Savitzky-Golay filter and Gaussian fitting sequentially to the plurality of Raman spectra obtained at regular time intervals, and applying a first-order Savitzky-Golay filter having a predetermined data frame length in a time domain to the Raman spectra.

The signal processor may calculate an average peak shift value over a predetermined time period based on the processed Raman spectra, and calculate a concentration of the target molecules in the object based on the average peak shift value over the predetermined time period.

The quantitative molecular sensing apparatus may further include: a Raman scattering substrate and a plurality of linker molecules fixed to the Raman scattering substrate, wherein the linker molecules are configured to bind with the target molecules in the object; and a timer configured to measure time taken for the target molecules in the object to react with the linker molecules on the Raman scattering substrate, wherein the signal processor refers to the time provided from the timer.

The predetermined time period may end prior to a reaction between the target molecules and the linker molecules reaching a chemical equilibrium state and may begin after the reaction between the target molecules and the linker molecules begins.

The quantitative molecular sensing apparatus may further include memory in which a lookup table about correlation between average peak shift values and concentrations of the target molecules over the predetermined time period is stored, wherein the signal processor is configured to determine a concentration of the target molecules in the object with reference to the lookup table stored in the memory.

The memory may further store data about a difference between an average peak shift over the predetermined time period and final Raman peak shift.

The signal processor may correct an error of the concentration of the target molecules in the object with reference to the data about the difference between the average peak shift over the predetermined time period and the final Raman peak shift.

According to an aspect of another exemplary embodiment, a quantitative molecular sensing method includes: irradiating excitation light onto an object using an illumination optical system; detecting light scattered from the object using a detection optical system; obtaining a Raman spectrum using a signal output by the detection optical system; and calculating a concentration of target molecules in the object based on a Raman peak shift value over a predetermined time period.

The quantitative molecular sensing method may further include placing the object on a Raman scattering substrate, before irradiating the excitation light onto the object.

A plurality of linker molecules may be fixed on a surface of the Raman scattering substrate, and the linker molecules may be configured to bind with the target molecules in the object.

The obtaining of the Raman spectrum using the signal output by the detection optical system may include obtaining a plurality of Raman spectra at regular time intervals.

The quantitative molecular sensing method may further include processing the plurality of Raman spectra using at least one signal processing technique.

The processing the plurality of Raman spectra may include applying a Savitzky-Golay filter and Gaussian fitting sequentially to the plurality of Raman spectra obtained at regular time intervals, and applying a first-order Savitzky-Golay filter having a predetermined data frame length in a time domain to the plurality of Raman spectra to which the Savitzky-Golay filter and the Gaussian fitting are applied.

The calculating of the concentration of the target molecules may include: calculating an average peak shift value over the predetermined time period based on the Raman spectra to which the first-order Savitzky-Golay filter is applied; and calculating a concentration of the target molecules in the object based on the average peak shift value over the predetermined time period.

The predetermined time period may end prior to a reaction between the target molecules in the object and the linker molecules on the Raman scattering substrate reaching a chemical equilibrium state and may begin after the reaction between the target molecules and the linker molecules begins.

The calculating of the concentration of the target molecules in the object based on the average peak shift value over the predetermined time period may include referring to a lookup table comprising correlations between average peak shift values and concentrations of the target molecules over the predetermined time period.

The calculating of the concentration of the target molecules in the object based on the average peak shift value over the predetermined time period may further include correcting an error of the concentration of the target molecules in the object with reference to data about a difference between an average peak shift over the predetermined time period and final Raman peak shift.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
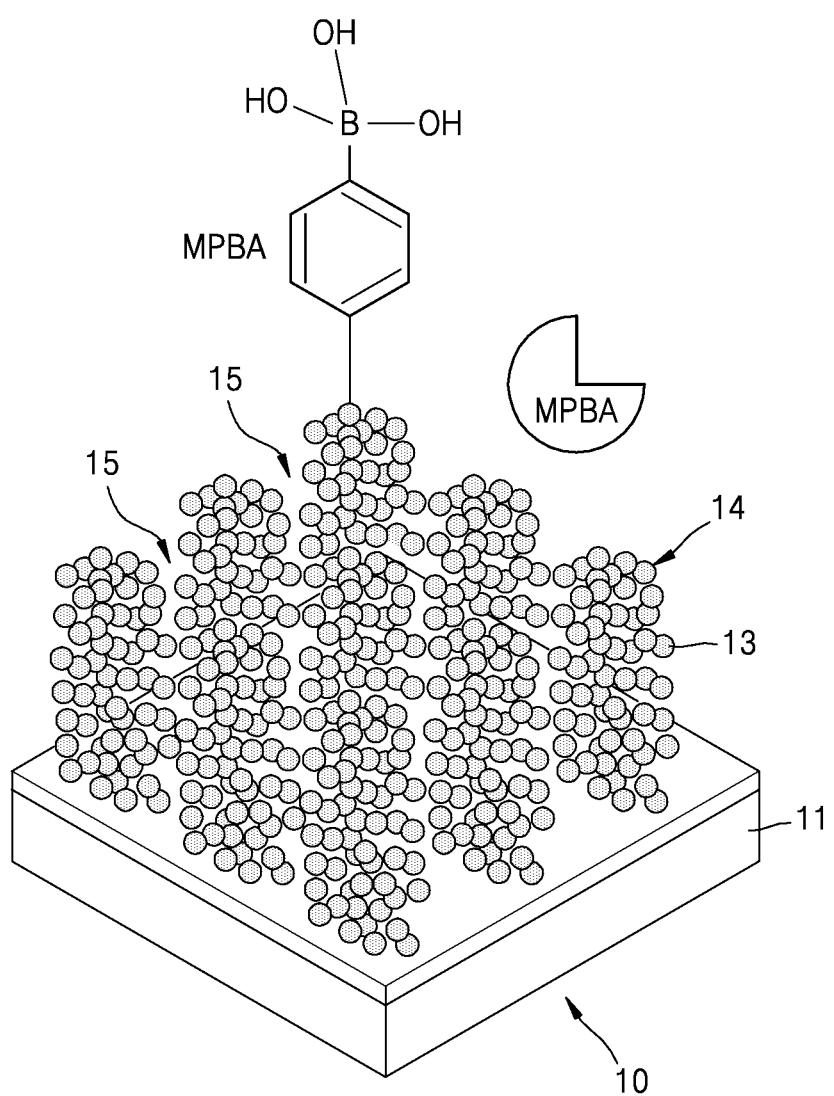
FIG. 1 is a conceptual view schematically showing a state in which no target molecules are bound with linker molecules fixed on a Raman scattering substrate.

Hereinafter, an apparatus and method for quantitative molecular sensing based on a Raman peak shift will be described in detail with reference to the accompanying drawings. Also, like reference numerals denoted in the drawings represent the same components, and for clarity and convenience of description, the sizes of the components may be more or less exaggeratedly shown in the drawings. Also, embodiments which described below are only exemplary, and various modifications of the embodiments are possible. Also, in a layered structure which will be described below, the terms "above" or "on" may include the meaning of above/below/left/right in a non-contact state, as well as just above/below/left/right in a contact state.

FIG. 1 is a conceptual view schematically showing a state in which no target molecules are bound with linker molecules fixed on a Raman scattering substrate. Referring to FIG. 1, a Raman scattering substrate 10 may be a Surface Enhanced Raman Scattering (SERS) substrate having, for example, a specially processed metal surface. The surface enhancement effect may depend on the structure of the metal surface of the Raman scattering substrate 10.

For example, the Raman scattering substrate 10 according to the current exemplary embodiment may include a support layer 11, a plurality of metal nanoparticle clusters 14 arranged on the support layer 11, and a plurality of holes 15 formed among the plurality of metal nanoparticle clusters 14 to transfer light, incident on a top of the substrate 10, to a bottom of the plurality of metal nanoparticle clusters 14, for example, to the support layer 11. The support layer 11 may be a semiconductor wafer including, for example, silicon (Si), germanium (Ge), gallium arsenide (GaAs), gallium phosphide (GaP), etc.

The plurality of metal nanoparticle clusters 14 may be concentrated on the support layer 11 and arranged two-dimensionally. Referring to FIG. 1, the metal nanoparticle clusters 14 may be positioned to extend substantially perpendicular to the support layer 11. Each metal nanoparticle cluster 14 may include a plurality of conductive metal nanoparticles 13 stacked in a 3-dimensional structure. The conductive metal nanoparticles 13 may include a metal having excellent conductivity, such as, aurum (Au), argentum (Ag), copper (Cu), and aluminum (Al). Each metal nanoparticle 13 may have an average diameter of about 10 nm to about 20 nm, and the plurality of metal nanoparticle clusters 14 may be arranged with an average interval of about 8 nm to about 20 nm. Also, the plurality of metal nanoparticle clusters 14 may each have a thickness of about 50 nm to about 1 μm.

The plurality of holes 15 may perforate among the plurality of metal nanoparticle clusters 14 so as to allow light, incident on a top of the substrate 10, to bottom of the plurality of metal nanoparticle clusters 14, for example to the support layer 11. Light incident from above of the plurality of metal nanoparticle clusters 14 may move through the holes 15 between the metal nanoparticle clusters 14 to arrive at the bottom of the Raman scattering substrate 10. In other words, light may pass between the metal nanoparticle clusters 14 through the holes 15 to arrive at the surface of the support layer 11. When light is transmitted along relatively long 3-dimensional paths, the light may excite a large number of conductive metal nanoparticles 13 located between the tops of the metal nanoparticle clusters 14 and the bottoms of the metal nanoparticle clusters 14. Accordingly, the Raman scattering substrate 10 according to the current exemplary embodiment may further increase the surface enhancement effect. However, the Raman scattering substrate 10 is not limited to the structure shown in FIG. 1 and may be any other surface enhanced Raman scattering substrate as long as the surface enhancement effect is obtained.

Generally, since target biomolecules such as glucose have low chemical affinity with the metal surface of a SERS substrate, linker molecules that may be easily bound with the target molecules may be bound with the metal surface. For example, a plurality of linker molecules may be bound with the surfaces of the metal nanoparticle clusters 14. In order to bind the plurality of linker molecules with the surfaces of the metal nanoparticle clusters 14, the Raman scattering substrate 10 may be placed inside a solution of the linker molecules so that the linker molecules are self-assembled and bound with the metal surface of the Raman scattering substrate 10. Various kinds of linker molecules may be selected according to the kind of target molecules. For example, if the target molecules are glucose, bisboronic acid, decanethiol (DT), mercaptohexanol (MH), mercaptophenylboronic acid (MPBA), etc. may be used. Particularly, when the Raman scattering substrate 10 shown in FIG. 1 and MPBA are used, the target molecules may be located very close to the conductive metal nanoparticles 13 inside the holes 15 wherein a strong electromagnetic field is formed by surface enhancement, resulting in improved detection sensitivity.

Figure 2:
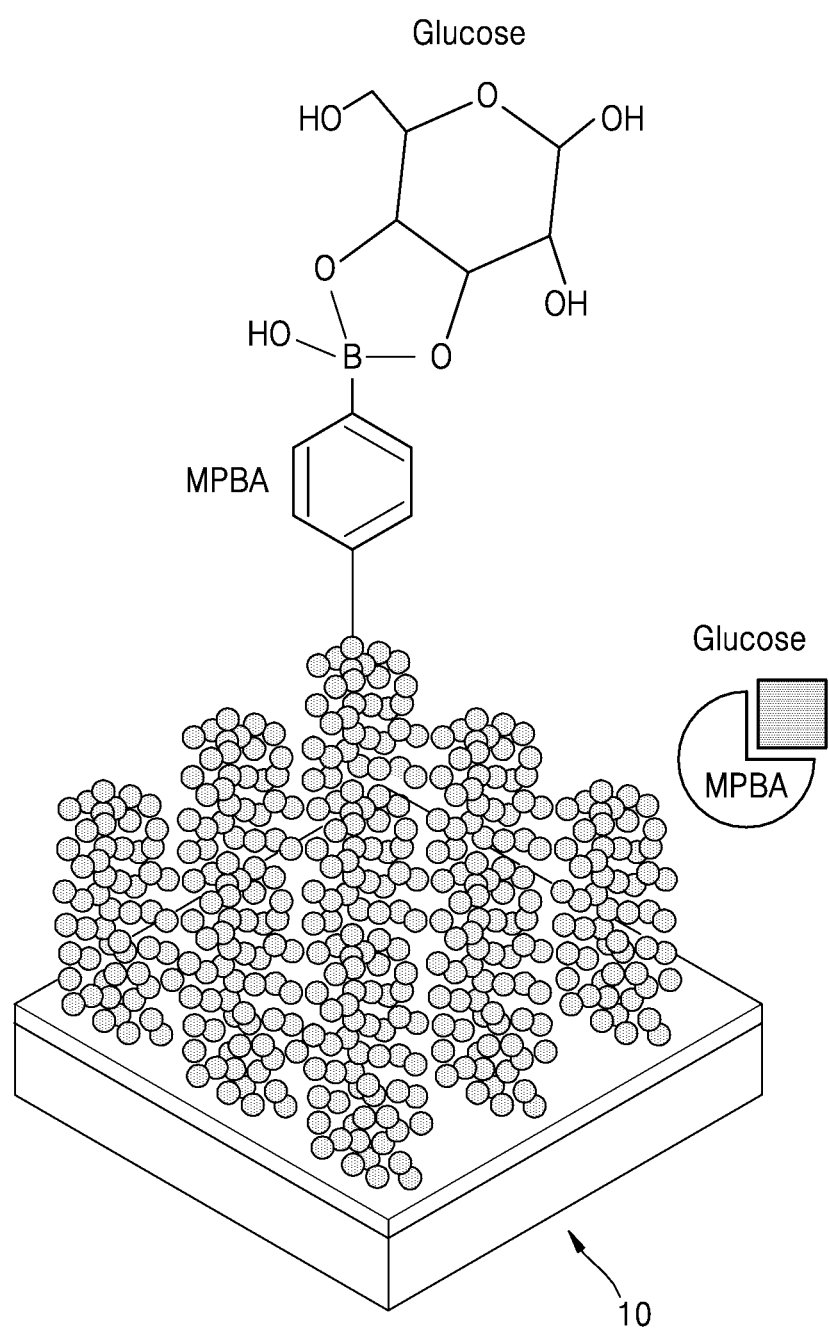
FIG. 2 is a conceptual view schematically showing a state in which target molecules are bound with linker molecules fixed on a Raman scattering substrate.

FIG. 2 is a conceptual view schematically showing a state in which target molecules are bound with linker molecules fixed on a Raman scattering substrate. In order to bind target molecules with linker molecules, the Raman scattering substrate 10 having the linker molecules may be placed into a sample solution including the target molecules. In FIGS. 1 and 2, for convenience of description, the linker molecules and the target molecules are exaggeratedly shown. However, the linker molecules and the target molecules are actually very small, and a very large number of the linker molecules and a very large number of the target molecules may be distributed on the surfaces of the metal nanoparticle clusters 14. Also, FIGS. 1 and 2 show an example in which the linker molecules are MPBA and the target molecules are glucose. However, the target molecules to be detected are not limited to glucose and another kind of linker molecules than MPBA may be used according to the kind of target molecules.

Figure 3:
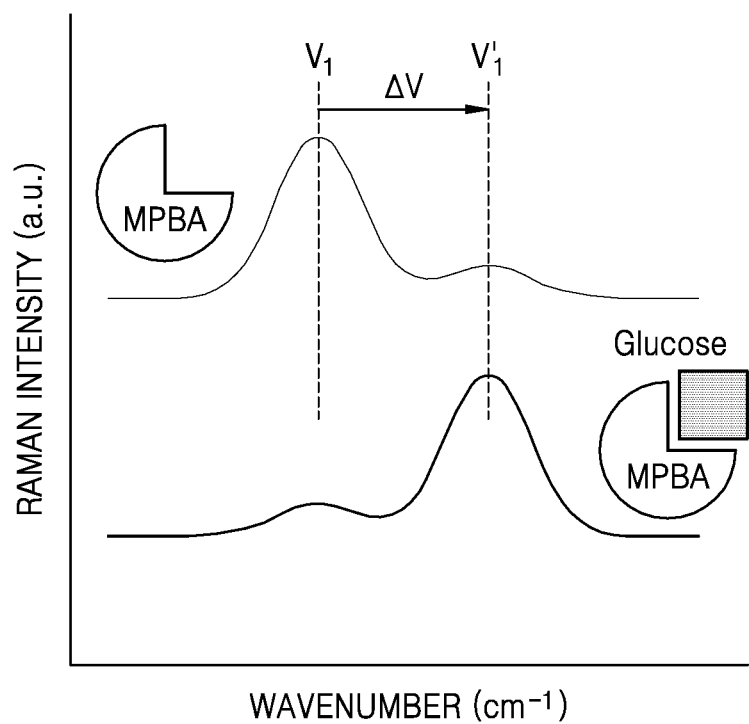
FIG. 3 is a graph conceptually showing a Raman spectrum before target molecules are bound with linker molecules and a Raman spectrum after the target molecules are bound with the linker molecules.

FIG. 3 is a graph conceptually showing a Raman spectrum before target molecules are bound with linker molecules and a Raman spectrum after the target molecules are bound with the linker molecules. For example, in FIG. 3, an upper graph shows a unique Raman spectrum of linker molecules, and a lower graph shows a Raman spectrum when target molecules are bound with linker molecules. The Raman spectrum may have a unique peak according to a material applied on the Raman scattering substrate 10. Accordingly, when target molecules are bound with linker molecules, a peak position on the Raman spectrum may be shifted, as shown in FIG. 3. The disclosure provides an exemplary apparatus and method for quantitatively sensing a concentration of target molecules by using such a Raman peak shift.

Figure 4:
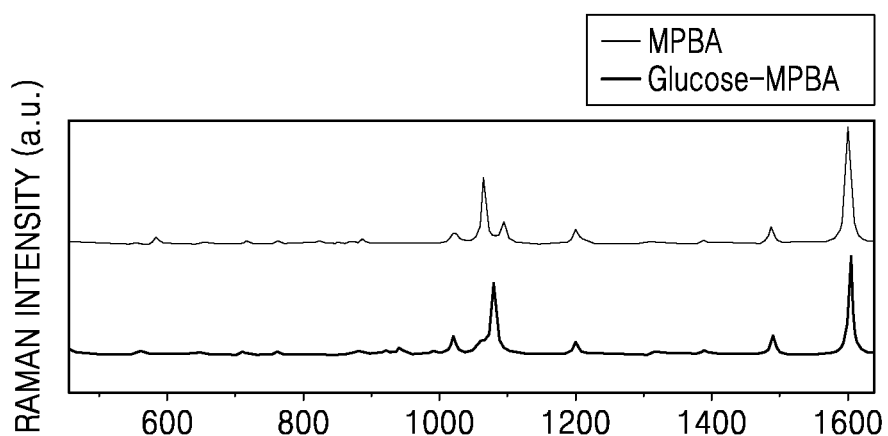
FIG. 4 is a graph showing examples of a Raman spectrum before target molecules are bound with linker molecules and a Raman spectrum after the target molecules are bound with the linker molecules, when the linker molecules are mercaptophenylboronic acid (MPBA) and the target molecules are glucose.

FIG. 4 is a graph showing examples of a Raman spectrum before target molecules are bound with linker molecules and a Raman spectrum after the target molecules are bound with the linker molecules, when the linker molecules are MPBA and the target molecules are glucose. The graph of FIG. 4 shows results obtained by numerical analysis of a Raman spectrum for $(OH^-)$-MPBA in a phosphate buffered saline (PBS) solution being mildly basic and a Raman spectrum for $(OH^-)$-MPBA bound with glucose, based on density functional theory (DFT).

Figure 5:
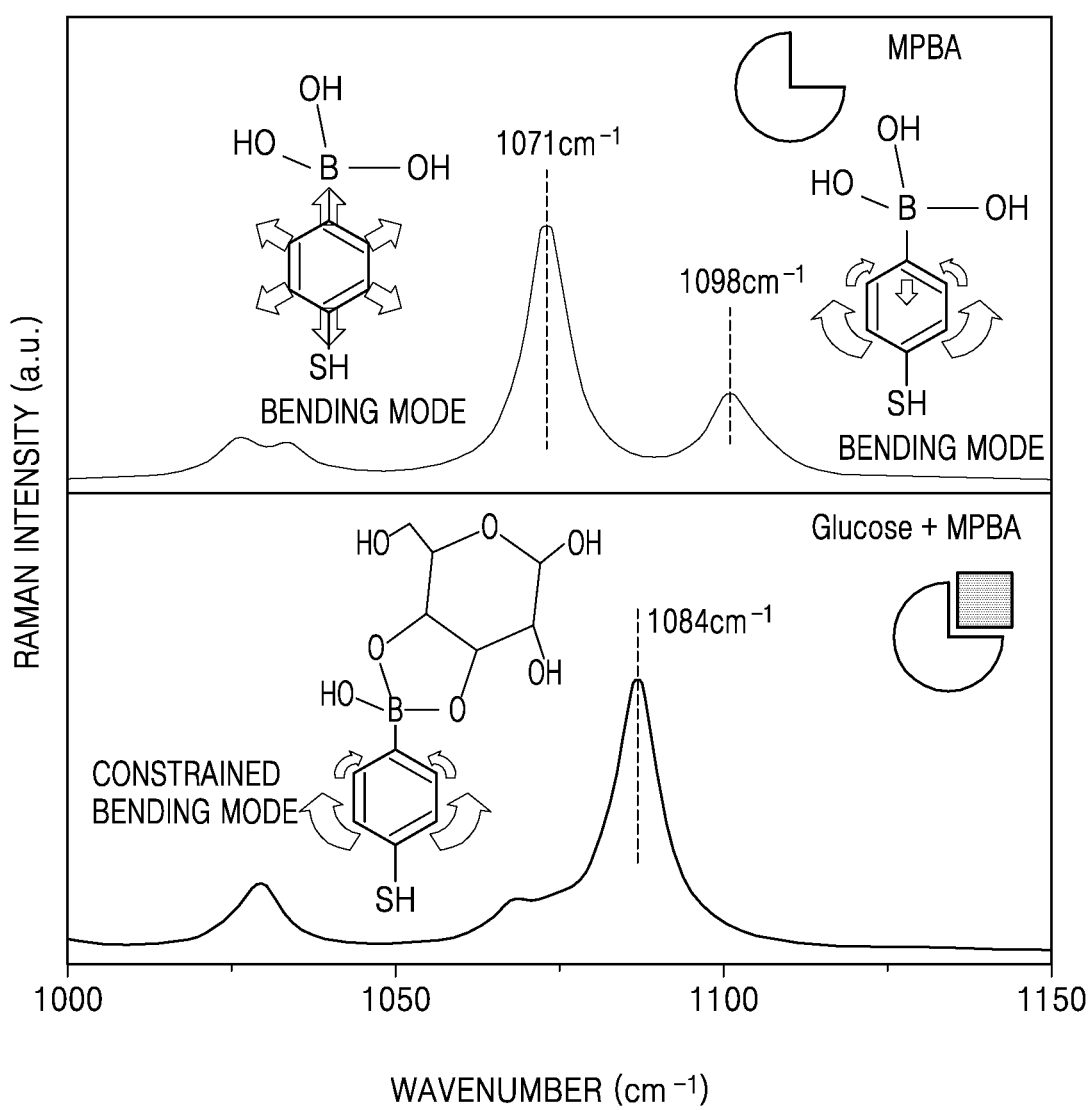
FIG. 5 is an enlarged view showing in detail a part of a wavenumber area of the graph of FIG. 4.

Also, FIG. 5 is a graph showing, in detail, a part of a wavenumber area in the graph of FIG. 4. In FIG. 5, the upper graph shows a Raman spectrum for $(OH^-)$-MPBA, and the lower graph shows a Raman spectrum for $(OH^-)$-MPBA bound with glucose. Referring to FIG. 5, peaks appear at 1071 $cm^{-1}$ and 1098 $cm^{-1}$ before the target molecules are bound with the linker molecules, and when the target molecules are bound with the linker molecules, a peak appears at 1084 cm$^{-1}$.

Figure 6A:
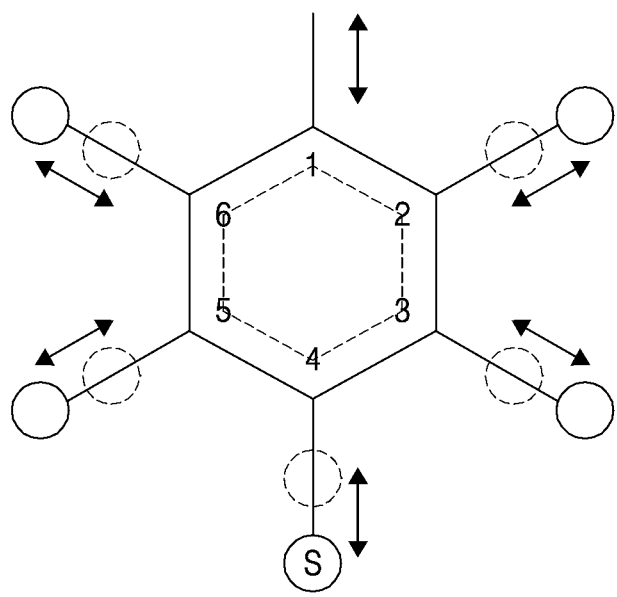
FIGS. 6A to 6C schematically show various vibration modes of a linker molecule.
Figure 6B:
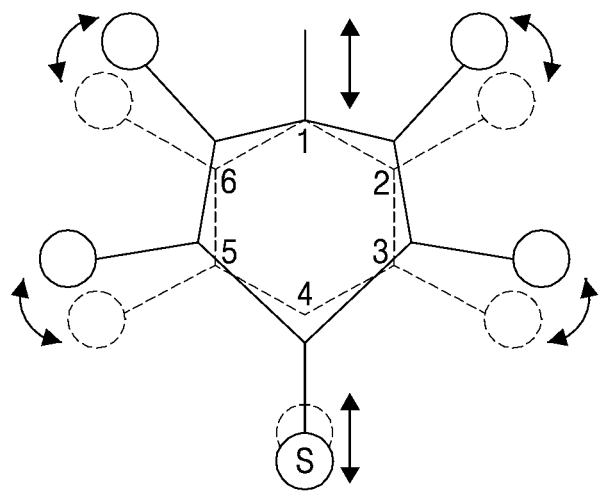
Figure 6C:
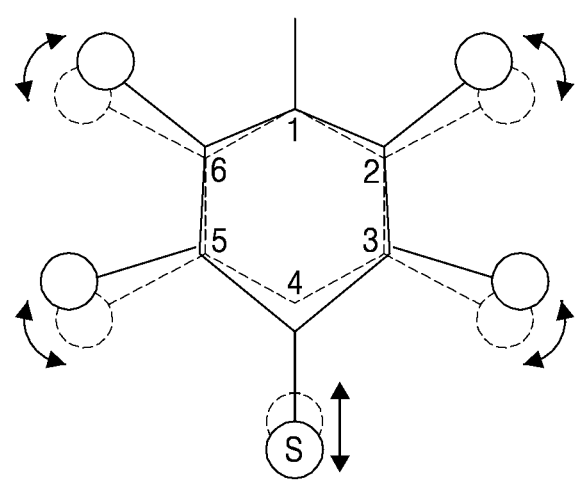

The peak shift is because binding with glucose greatly influences the elasticity of the MPBA linker molecules to change Raman scattering cross sections and geometrical shapes of vibration modes of the MPBA linker molecules. For example, FIGS. 6A to 6C schematically show various vibration modes of the MPBA linker molecules. FIG. 6A shows "breathing" mode vibrations in which the C-ring and C-S of a MPBA linker molecule stretching-vibrate radially. Due to the breathing mode vibrations, the Raman spectrum shows a peak at 1071 cm$^{-1}$. Also, FIG. 6B shows "bending" mode vibrations in which in the C-ring of a MPBA linker molecule, bonding angles between atoms change. Due to the bending mode vibrations, the Raman spectrum shows a peak at 1098 cm$^{-1}$. Finally, FIG. 6C shows "constrained-bending" mode vibrations in which in the C-ring of a MPBA linker molecule, bonding angles between atoms change slightly. Due to the constrained-bending mode vibrations, the Raman spectrum shows a peak at 1084 cm$^{-1}$.

If no glucose is bound with a MPBA linker molecule, the MPBA linker molecule may perform breathing mode vibrations and bending mode vibrations. Accordingly, as shown in the upper graph of FIG. 5, peaks may appear at 1071 cm$^{-1}$ and 1098 cm$^{-1}$ of the Raman spectrum. If glucose is bound with a MPBA linker molecule, no breathing mode vibrations may occur, and bending mode vibrations may change to constrained-bending mode vibrations. Accordingly, as shown in the lower graph of FIG. 5, the peak may be shifted to 1084 cm$^{-1}$.

The case in which the peak is shifted to 1084 cm$^{-1}$ is a case in which glucose is bound with all MPBA linker molecules on the Raman scattering substrate 10. An amount of MPBA linker molecules bound with glucose will change according to a glucose concentration in a sample. For example, the higher the concentration of glucose in a sample, the more MPBA linker molecules are bound with the glucose. Accordingly, as a glucose concentration in a sample increases, the peak of the Raman spectrum may be shifted gradually from 1071 cm$^{-1}$ to 1084 cm$^{-1}$.

Figure 7:
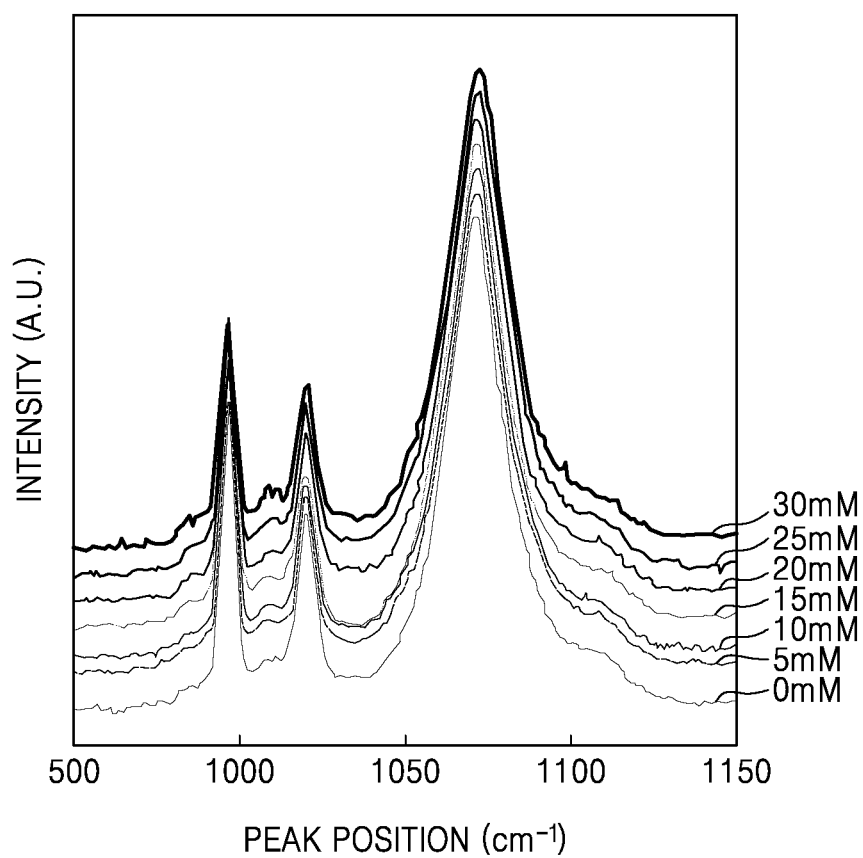
FIG. 7 shows normalized Raman spectra for various concentrations of target molecules.
Figure 8:
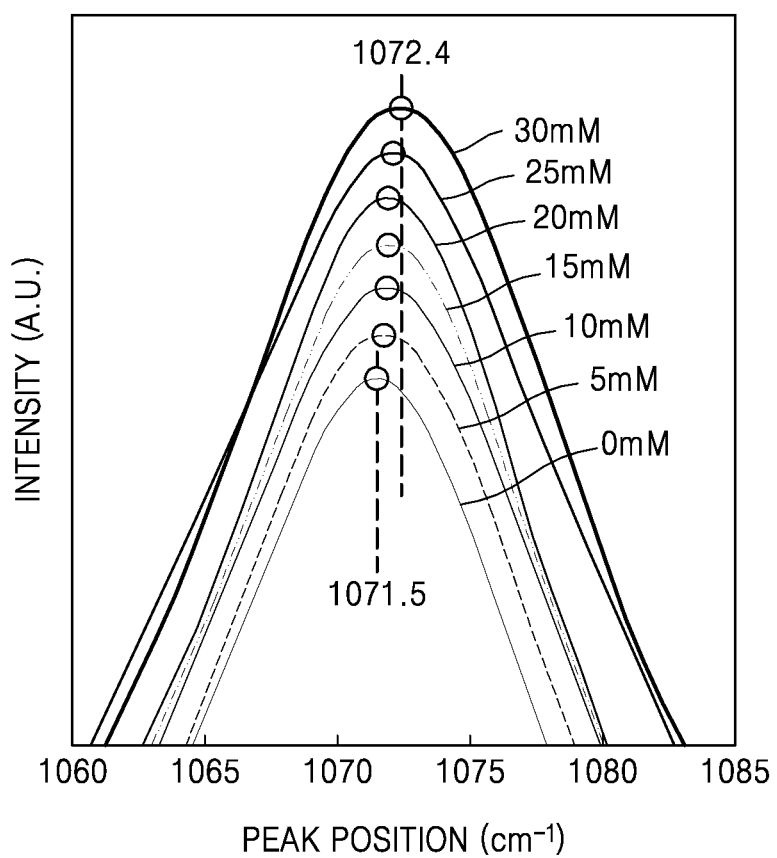
FIG. 8 is a graph showing in detail a peak of the graph of FIG. 7.
Figure 9:
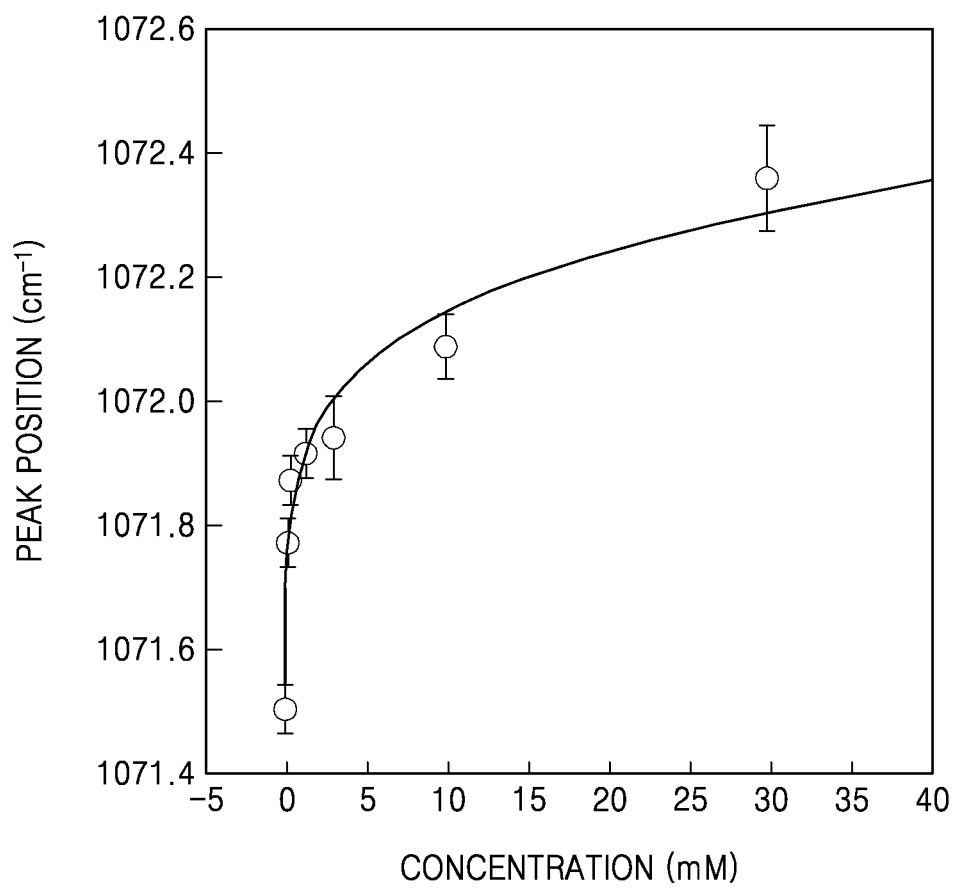
FIG. 9 is a graph showing an example of a relationship between concentrations of target molecules and Raman peak positions.

For example, FIG. 7 shows normalized Raman spectra for various concentrations of target molecules. The graph of FIG. 7 shows Raman spectra when MPBA linker molecules exist in solutions with glucose concentrations of 0 mM, 5 mM, 10 mM, 15 mM, 20 mM, 25 mM, and 30 mM. Also, FIG. 8 is an enlarged view showing, in detail, a peak of 1071 cm$^{-1}$ in the graph of FIG. 7. It is seen from FIG. 8 that as a glucose concentration increases from 0 mM to 30 mM, a peak is shifted gradually from 1071.5 cm$^{-1}$ to 1072.4 cm$^{-1}$. FIG. 9 is a graph showing an example of a relationship between concentrations of target molecules and Raman peak positions based on the results shown in the graphs of FIGS. 7 and 8. It is seen from FIG. 9 that the Raman peak is shifted sharply at concentrations between 0 mM and 5 mM, and shifted gently at concentrations of 10 mM or higher.

Figure 10:
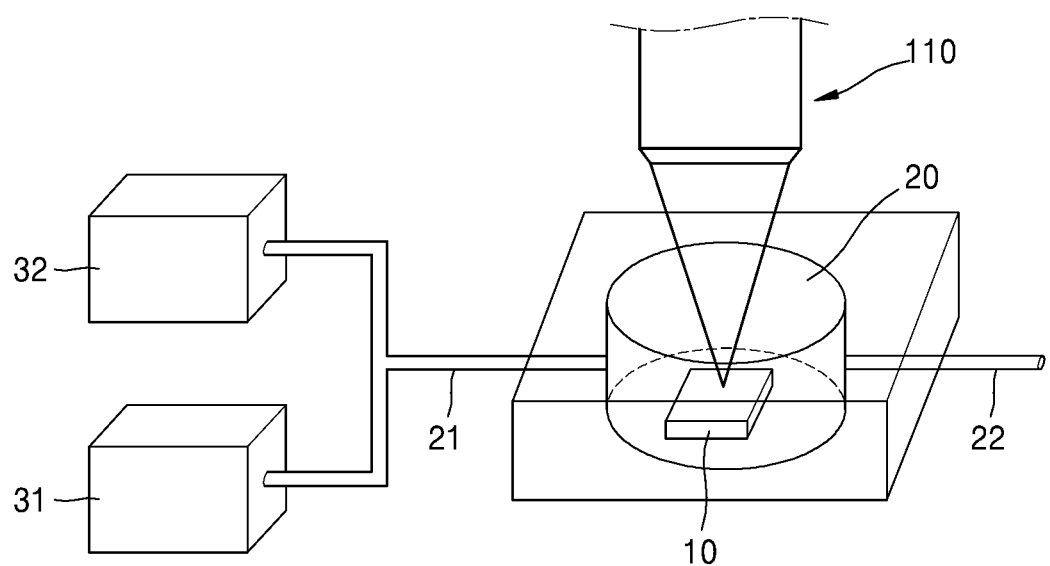
FIG. 10 shows an example of an experiment configuration for observing Raman peak shift while repeatedly changing a concentration of target molecules between 0 mM and 1 mM.

FIG. 10 shows an example of an experiment configuration for observing Raman peak shift while repeatedly changing a concentration of target molecules between 0 mM and 1 mM. Referring to FIG. 10, the Raman scattering substrate 10 is placed in a chamber 20 made of poly dimethyl siloxane (PDMS), and a sample supplier 31 and a cleaning buffer solution supplier 32 are connected to an inlet 21 of the chamber 20. MPBA linker molecules are bound with the surface of the Raman scattering substrate 10. The sample supplier 31 supplies a sample solution with a glucose concentration of 1 mM to the chamber 20 through the inlet 21. The cleaning buffer solution supplier 32 supplies phosphate buffered saline (PBS), which is a cleaning buffer solution, to the chamber 20 through the inlet 21.

The sample supplier 31 and the cleaning buffer solution supplier 32 supply the sample solution and the cleaning buffer solution, alternately, each for 80 minutes. For example, the sample supplier 31 first supplies a sample solution with a glucose concentration of 1 mM to the chamber 20 for 80 minutes. Then, the sample supplier 31 stops operating, and the cleaning buffer solution supplier 32 supplies PBS with a glucose concentration of 0 mM to the chamber 20 for 80 minutes, while the sample supplier 31 discharges the sample solution in the chamber 20 through an outlet 22, thereby removing the glucose bound with the MPBA linker molecules. Thereafter, the cleaning buffer solution supplier 32 stops operating, and the sample supplier 31 supplies the sample solution to the chamber 20. While the operation is repeated, laser light is irradiated onto the Raman scattering substrate 10 through an illumination optical system 110, and then Raman-scattered light is observed. The illumination optical system 110 uses 0.07 mW laser having a wavelength of 785 nm, as a light source.

Figure 11:
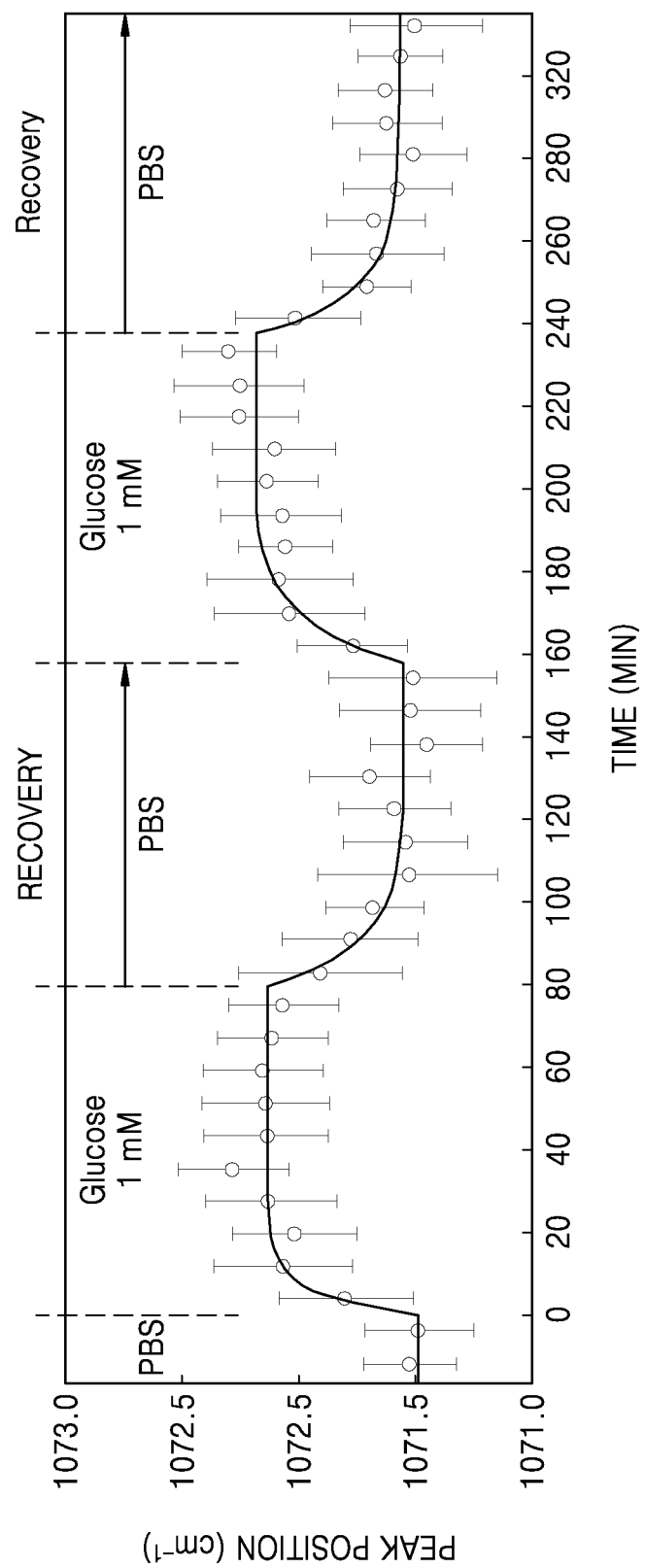
FIG. 11 is a graph showing a Raman peak shift while repeatedly changing a concentration of target molecules between 0 mM and 1 mM.

FIG. 11 is a graph showing Raman peak shift when repeatedly changing a concentration of target molecules between 0 mM and 1 mM. Referring to FIG. 11, when the sample supplier 31 starts supplying a sample solution, a wavenumber of a peak increases sharply. Then, when a predetermined time period has elapsed, the inside of the chamber 20 reaches an equilibrium state so that the peak does not move any longer. Also, when the cleaning buffer solution supplier 32 starts supplying PBS, the wavenumber of the peak decreases sharply. Thereafter, when a predetermined time period has elapsed, most of the glucose in the chamber 20 has been removed so that the peak is fixed around 1071.5 cm$^{-1}$.

Figure 12:
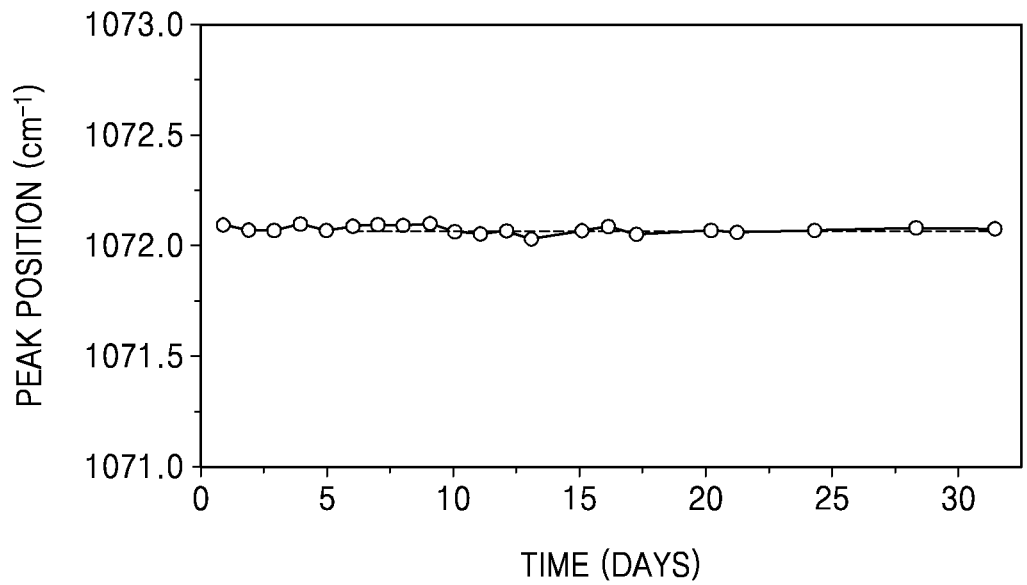
FIG. 12 is a graph showing the stability of Raman peak position measurement over a long time.

FIG. 12 is a graph showing the stability of Raman peak position measurement over a long time. The experiment described above with reference to FIGS. 10 and 11 was carried out over 30 days, and a peak position was measured in a saturation state while glucose of 1 mM is supplied. As a result, the daily average shift of the peak position was measured as 0.0006 cm$^{-1}$, which represents a very excellent stability. Accordingly, measurements over a long time obtained the same consistent results.

Meanwhile, in the case of measuring a peak position after waiting until the inside of the chamber 20 has reached a chemical equilibrium state, it takes an excessively long time to measure a concentration of target molecules. In order to more quickly measure a concentration of target molecules, it may be noted that a shift rate of a peak position changes according to a concentration of target molecules. For accurate quantitative analysis, it is important to accurately identify a peak position, and to effectively suppress noise.

For example, according to the current exemplary embodiment, a Raman spectrum is measured every second, and a Savitzky-Golay filter and Gaussian fitting are applied sequentially to all Raman spectra. The Savitzky-Golay filter is used to reduce noise in the Raman spectra, and the Gaussian fitting is used to identify peak positions. When the Savitzky-Golay filter and the Gaussian fitting are applied in combination, the limit of detection (LOD) of Raman peak shift is estimated to be about 0.036 cm$^{-1}$. Accordingly, in view of the repeatability and resolution of typical Raman spectroscopy, peak shift for various concentrations of target molecules may be sufficiently accurately measured. However, the Savitzky-Golay filtering and the Gaussian fitting are just examples of various signal processing techniques.

The Raman spectra may be processed using any other signal processing techniques in order to identify a peak position and to suppress noise.

Figure 13:
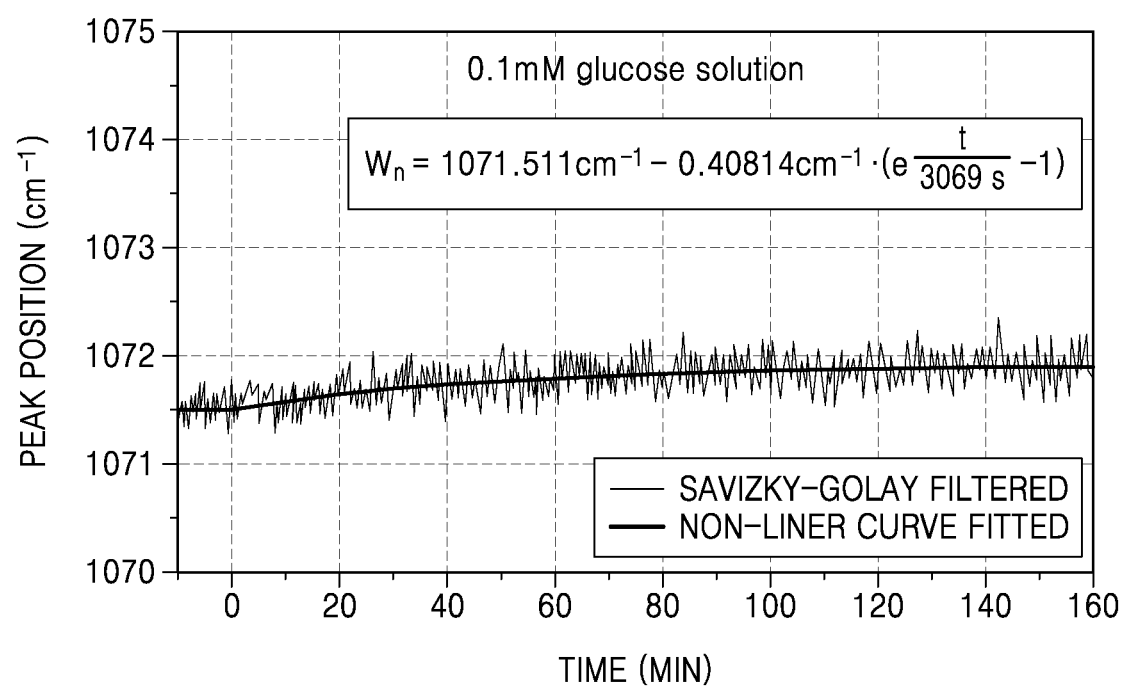
FIGS. 13 to 15 are graphs showing a Raman peak shift in the case of target molecules having different concentrations over time.
Figure 14:
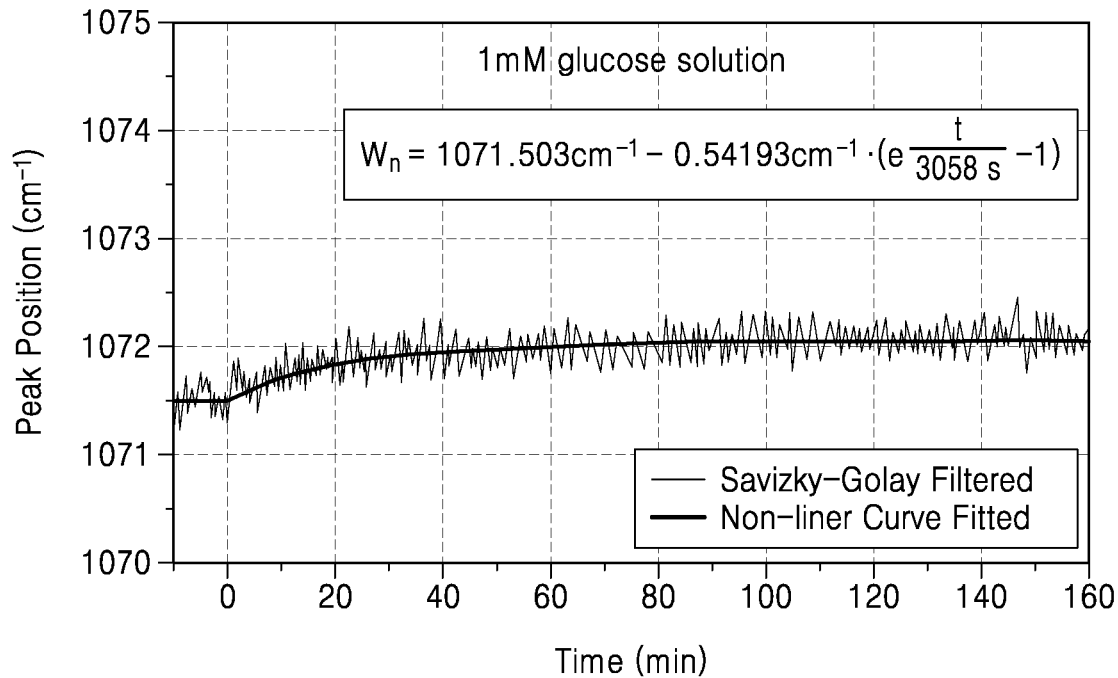
Figure 15:
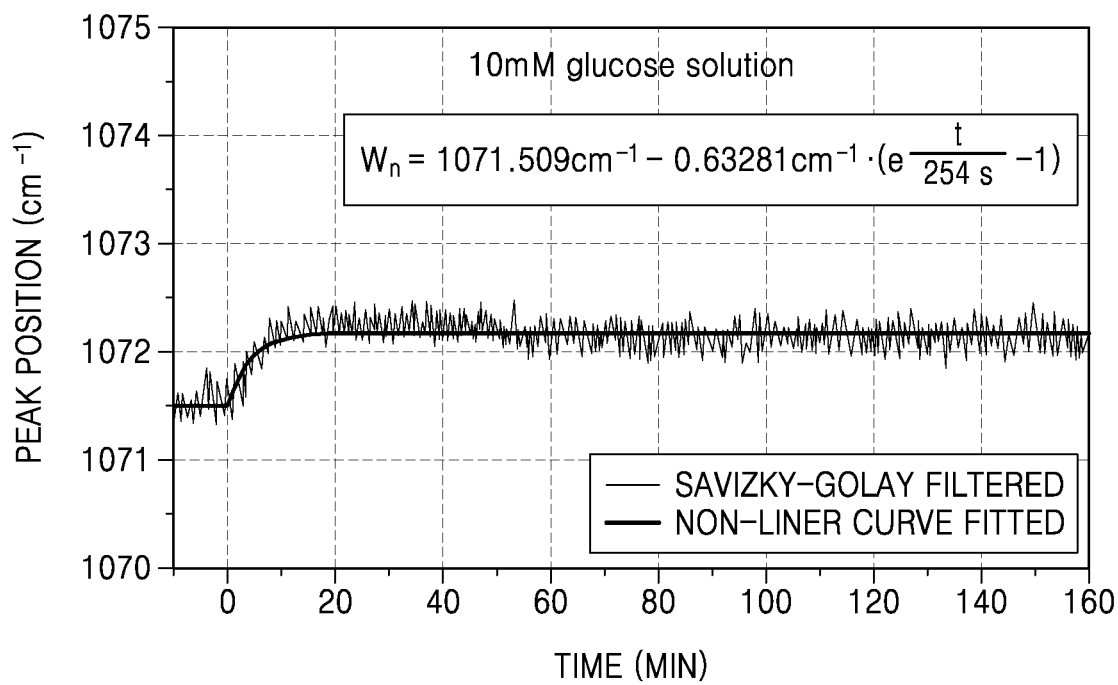

FIGS. 13 to 15 are graphs showing a Raman peak shift of target molecules having different concentrations over time. FIG. 13 corresponds to a case in which a concentration of glucose is 0.1 mM, FIG. 14 corresponds to a case in which a concentration of glucose is 1 mM, and FIG. 15 corresponds to a case in which a concentration of glucose is 10 mM. The graphs of FIGS. 13 to 15 are results obtained when the Savitzky-Golay filter and the Gaussian fitting are applied sequentially to Raman spectra obtained each second, and then, a first-order Savitzky-Golay filter having a 21-frame length is applied, wherein the data frame length is not limited to 21 data frames. That is, two or more data frames may be selected and applied as necessary. Also, using Raman spectra obtained every second is only an example, and Raman spectra obtained at different regular time intervals may be used.

Figure 16:
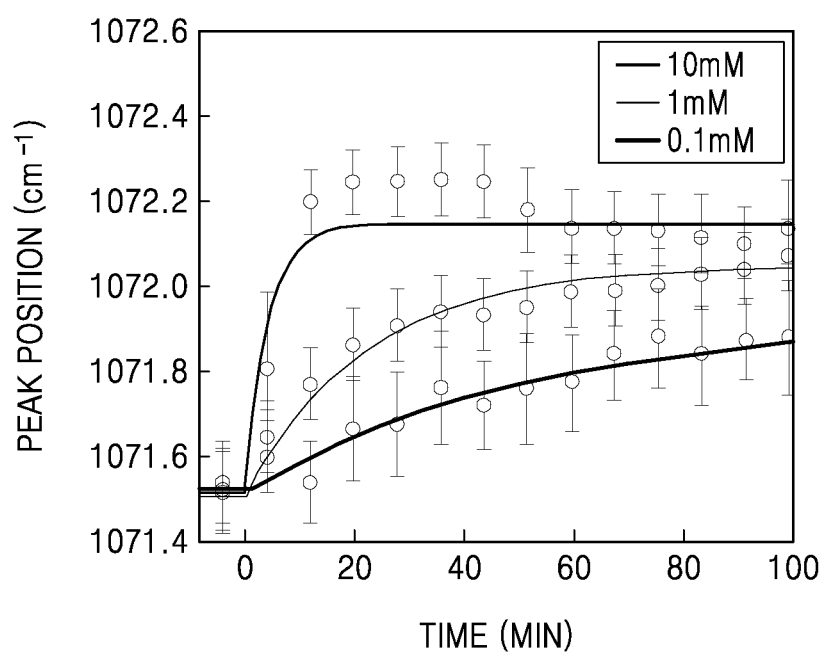
FIG. 16 is a graph for comparing a Raman peak shift in the case of target molecules having different concentrations over time.

Also, FIG. 16 is a graph for comparing a Raman peak shift for target molecules having different concentrations over time. Referring to the graph of FIG. 16, different Raman peak shift rates are measured at different glucose concentrations of 0.1 mM, 1 mM, and 10 mM. Particularly, initial slopes are functions of concentrations of target molecules and may be remarkably distinguished according to the concentrations. Accordingly, in the graph showing a Raman peak shift over time, a concentration of target molecules may be predicted using an initial slope or a Raman peak shift rate.

For example, a reaction between MPBA and glucose may be expressed by a first-order rate equation, which influences the relationship between a wavenumber of a peak and a concentration of glucose. Accordingly, the relationship between a concentration of glucose and a Raman peak shift rate may be deduced based on the graphs shown in FIGS. 13 to 15. First, a relationship between a change in peak wavenumber and a concentration of glucose may be generally expressed by Equation 1 below.

$$W_n(t) = W_o + A(c(t))\left(\exp\left(-\frac{t}{\tau(c(t))}\right) - 1\right) \quad \text{Equation 1}$$

In Equation 1, $W_n$ represents a wavenumber in a glucose solution, and $W_o$ represents a wavenumber in a PBS solution (that is, a wavenumber when a concentration of glucose is 0 mM). Also, A and $\tau$ represent coefficient functions depending on a concentration c of glucose, and t represents time.

By obtaining the derivative of Equation 1 in the form of a first-order linear differential equation, the following Equation 2 is obtained.

$$\frac{dW_n(t)}{dt} = \chi_1(t)W_n(t) + \chi_2(t) \quad \text{Equation 2}$$

In Equation 2, $x_1$ and $x_2$ represent representative functions depending on A, $\tau$, c, and t. By deciding $x_1$ and $x_2$ based on the graphs of FIGS. 13 to 15 obtained from measurements for glucose concentrations of 0.1 mM, 1 mM, and 10 mM, Raman peak shift for different glucose concentrations may be predicted.

Figure 17:
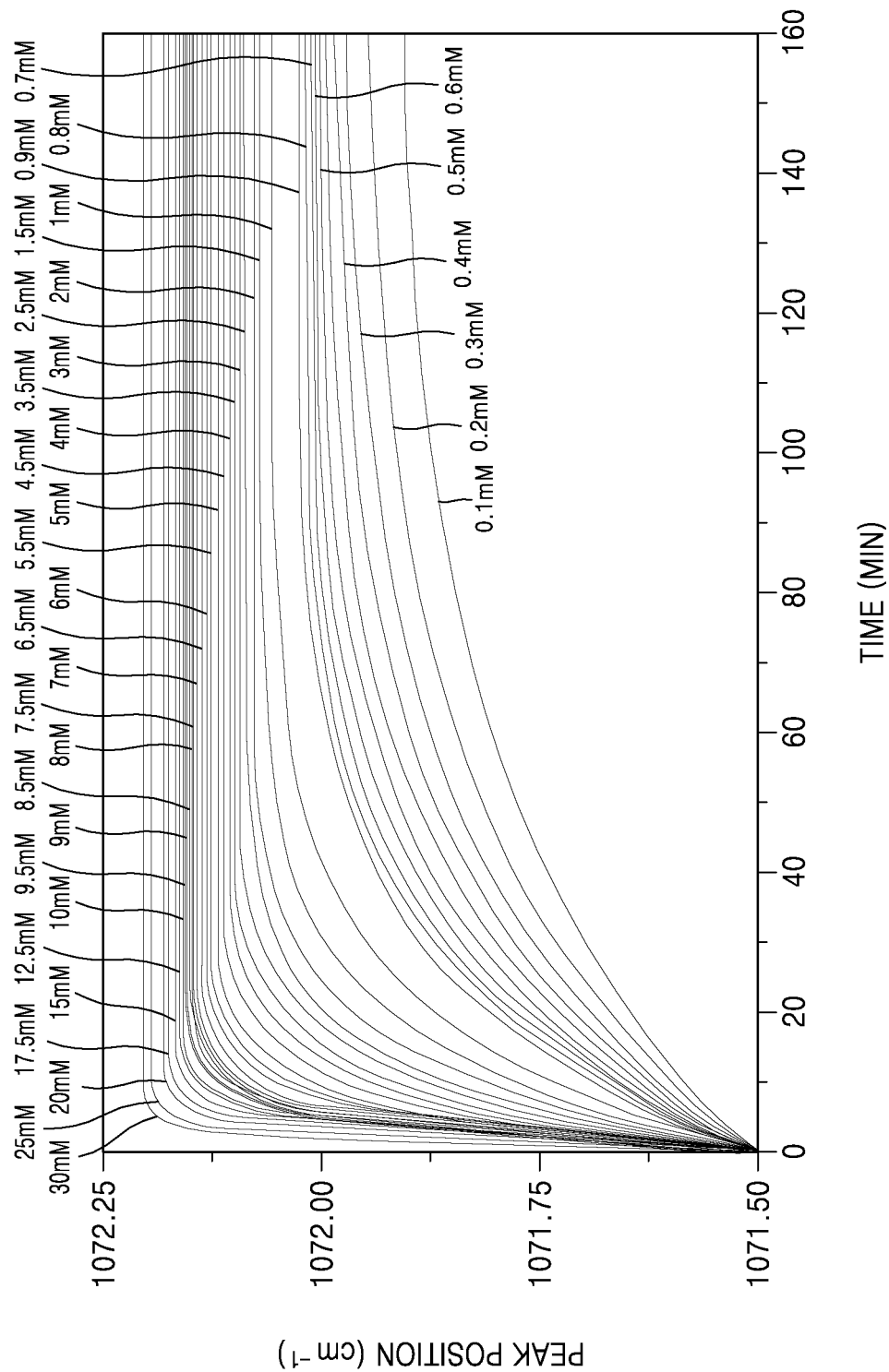
FIG. 17 is a graph showing a predicted Raman peak shift over 160 minutes in the case of target molecules having different concentrations over time.
Figure 18:
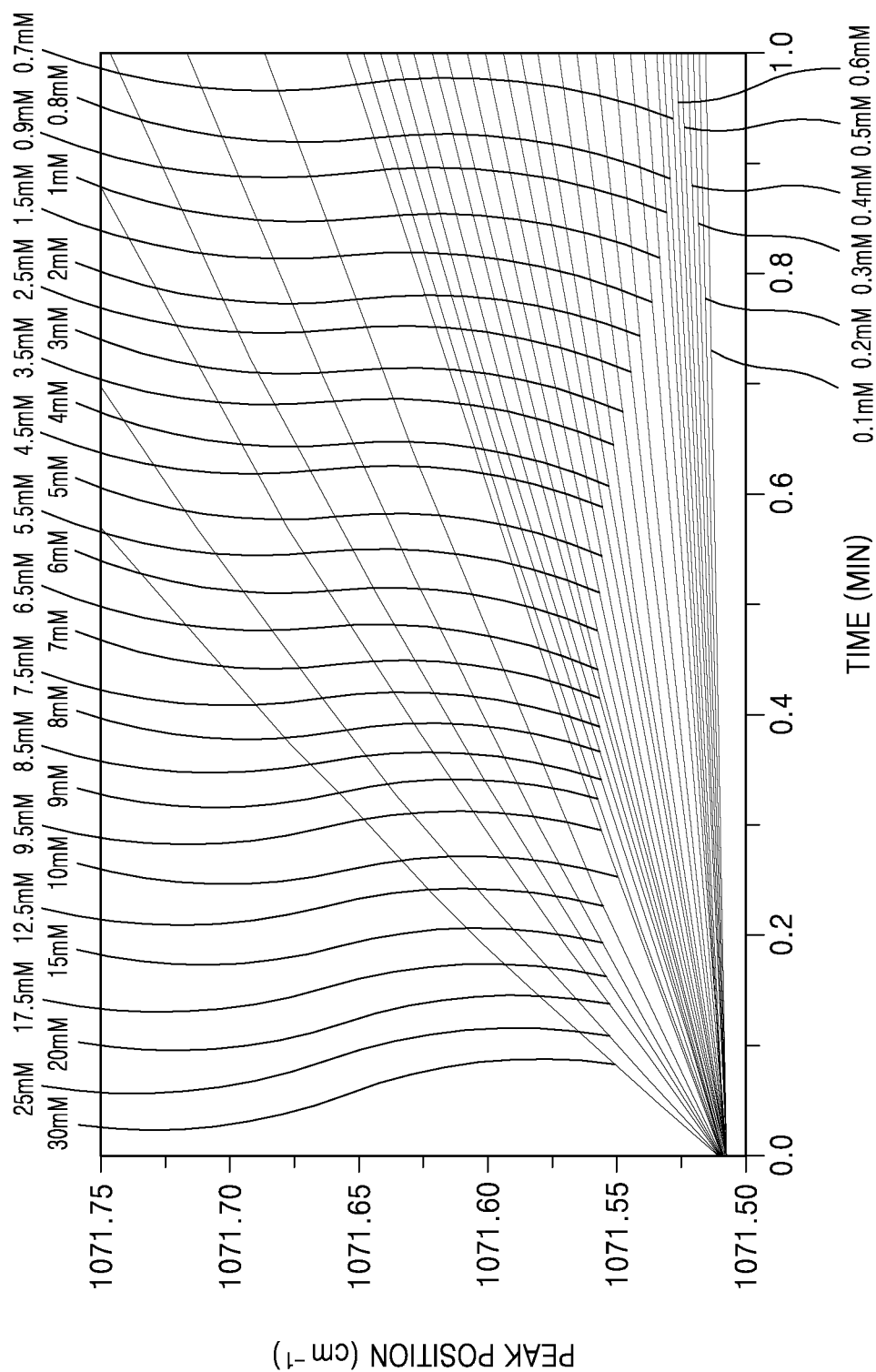
FIG. 18 is a graph showing a predicted Raman peak shift for an initial 1 minute in the case of target molecules having different concentrations over time.

For example, FIG. 17 is a graph showing a predicted Raman peak shift for 160 minutes for target molecules having different concentrations over time, and FIG. 18 is a graph showing predicted Raman peak shift for an initial 1 minute for target molecules having different concentrations over time. The graphs of FIGS. 17 and 18 illustrate numerical expressions of a function $W_n(t)$ obtained by applying $x_1$ and $x_2$ determined based on the graphs of FIGS. 13 to 15 to Equation 2.

Figure 19:
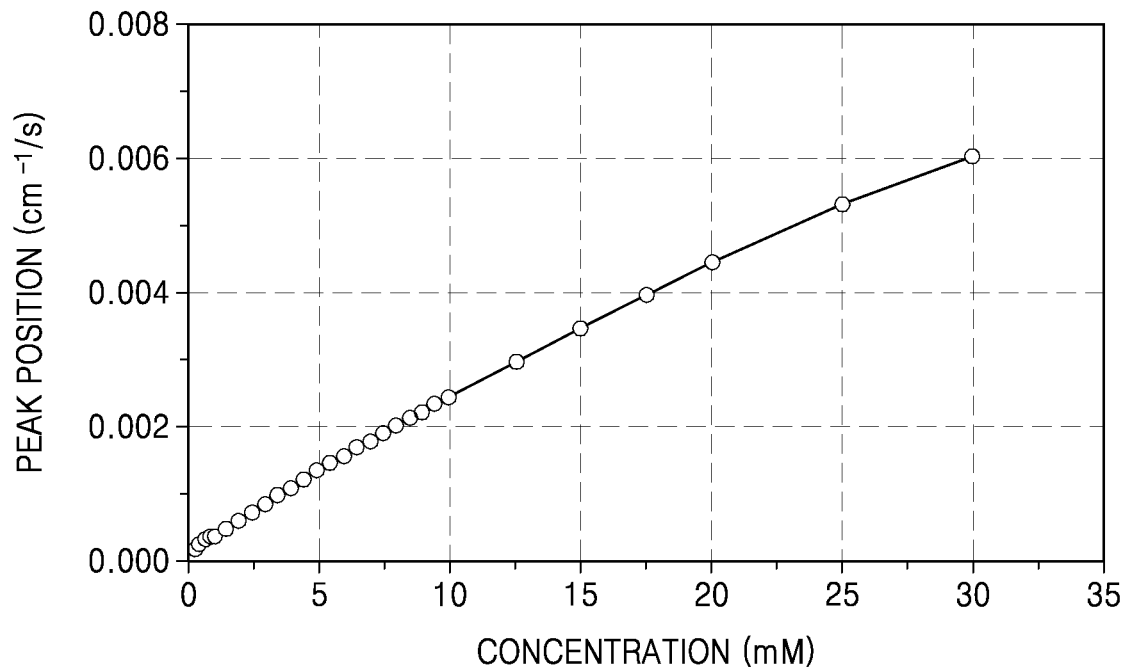
FIG. 19 is a graph showing the relationship between concentrations of target molecules and average shift rates in a Raman peak position for an initial 1 minute.

Also, FIG. 19 is a graph showing a relationship between a concentration of target molecules and an average shift rate in Raman peak position for an initial 1 minute. The graph of FIG. 19 was obtained based on the graph of FIG. 18. In other word, the graph of FIG. 19 represents average slope values of peak shift for an initial 1 minute for individual concentrations of target molecules shown in FIG. 18.

Figure 20:
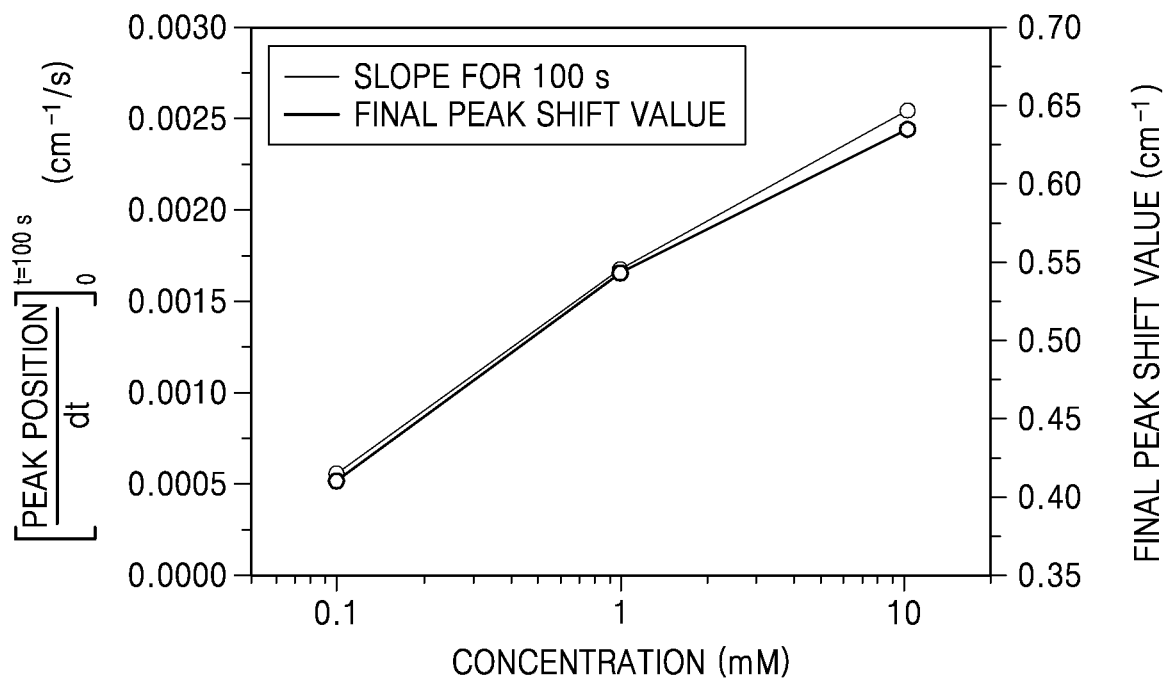
FIG. 20 is a graph for comparing a shift rate in a Raman peak position for an initial 1.6 minutes to final Raman peak shift.

Meanwhile, FIG. 20 is a graph for comparing a shift slope (rate) in a Raman peak position for an initial 100 seconds to a final Raman peak shift. In the graph of FIG. 20, the shift slope (rate) in the Raman peak position for the initial 100 seconds refers to the left vertical axis, and the final Raman peak shift refers to the right vertical axis. The final Raman peak shift means the Raman peak shift when the reaction between target molecules and linker molecules has reached an equilibrium state. Referring to FIG. 20, it may be seen that the shift slope in Raman peak position for initial 100 seconds is nearly parallel to the final Raman peak shift.

Accordingly, the graph of FIG. 19 may be used to quickly estimate an unknown concentration of target molecules without waiting until a reaction in a chamber has reached a chemical equilibrium state. For example, the graph of FIG. 19 may be stored in a lookup table. Then, for example, by measuring a degree of peak shift of a Raman spectrum for target molecules with an unknown concentration in a sample for an initial 1 minute, and then referring to the lookup table based on an average peak shift value for the initial 1 minute, a concentration of the target molecules in the sample may be obtained. For convenience of description, an average peak shift for the initial 1 minute has been used, however, this is only an example. That is, another time period may be selected as necessary. In an exemplary embodiment, a part of an initial time period before a reaction between target molecules and linker molecules has reached a chemical equilibrium state from when the reaction between target molecules and linker molecules starts may be selected in consideration of the desired accuracy of concentration measurement.

Also, referring to FIG. 20, it may be seen that if the concentration of the target molecules exceeds 1 mM, a small difference is generated between the shift slope for the initial 100 seconds and the final Raman peak shift. Accordingly, such a difference may be stored in advance in the lookup table, and used to correct an error of a concentration of target molecules estimated based on the graph of FIG. 19. Data error-corrected using the graphs of FIGS. 19 and 20 may be stored in the lookup table.

So far, an exemplary embodiment in which target molecules in a sample are glucose has been described. However, the method according to the current exemplary embodiment is not limited to quantitatively analyzing only glucose. In another exemplary embodiment, other biomolecules, such as urea, ceramide, keratin, collagen, etc., may also be quantitatively analyzed by the same principle as described above.

Figure 21:
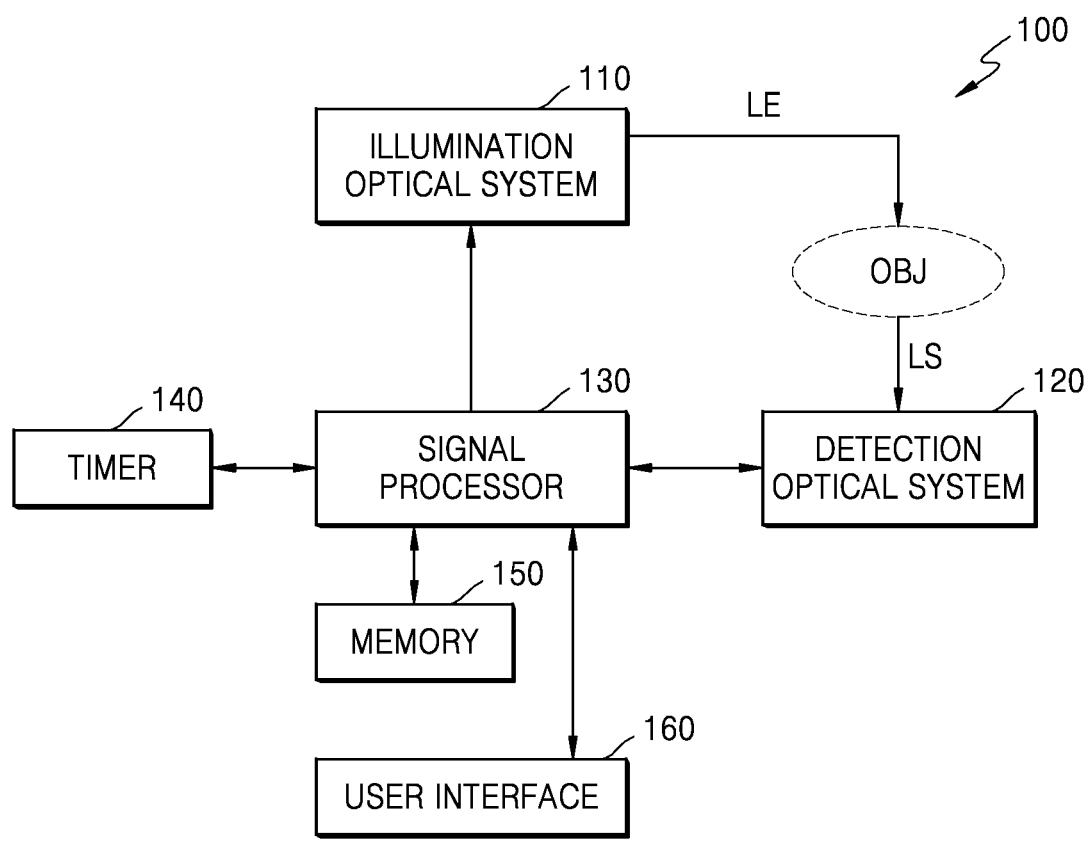
FIG. 21 is a block diagram schematically showing a quantitative molecular sensing apparatus according to an exemplary embodiment.

FIG. 21 is a block diagram schematically showing a quantitative molecular sensing apparatus according to an exemplary embodiment. Referring to FIG. 21, a quantitative molecular sensing apparatus 100 according to an exemplary embodiment may include the illumination optical system 110 including a light source for irradiating excitation light LE to an object OBJ, a detection optical system 120 including an optical detector for detecting light LS scattered from the object OBJ, and a signal processor 130 for analyzing properties of the object OBJ using an output signal from the detection optical system 120. The quantitative molecular sensing apparatus 100 may further include the Raman scattering substrate 10 on which the object OBJ is placed, although not shown in FIG. 21. Also, the quantitative molecular sensing apparatus 100 may further include a timer 140 for measuring time taken for target molecules in the object OBJ to react with linker molecules on the Raman scattering substrate 10. In FIG. 21, the timer 140 is shown separately from the signal processor 130; however, the timer 140 may be a part of the signal processor 130. For example, the timer 140 and the signal processor 130 may be implemented as a single semiconductor chip.

The signal processor 130 may analyze a spectrum and an intensity of the light LS scattered from the object OBJ to thereby analyze properties of the object OBJ. The signal processor 130 may be configured to control operations of the illumination optical system 110 and the detection optical system 120. Particularly, the signal processor 130 may obtain a Raman spectrum using an signal output from the detection optical system 120, and calculate a concentration of the target molecules in the object OBJ using the Raman spectrum. In order to accurately identify a peak position and effectively suppress noise, the signal processor 130 may be configured to process Raman spectra obtained at regular time intervals using various signal processing techniques. For example, signal processor 130 may apply the Savitzky-Golay filter and Gaussian fitting sequentially to Raman spectra obtained at regular time intervals, and then apply the first-order Savitzky-Golay filter having a predetermined data frame length in a time domain to the Raman spectra. Then, the signal processor 130 may calculate an average peak shift value over a predetermined time period based on the processed Raman spectra, and calculate a concentration of the target molecules in the object OBJ. The signal processor 130 may refer to time provided from the timer 140.

Also, the quantitative molecular sensing apparatus 100 may further include memory 150 for storing programs, data, etc. required for the processing performed by the signal processor 130, and a user interface 160 for providing a user with results analyzed by the signal processor 130. The quantitative molecular sensing apparatus 100 may further include an amplifier for amplifying a signal detected by the detection optical system 120, although not shown in the drawings.

Also, the signal processor 130 may generate control signals to control overall operations of the quantitative molecular sensing apparatus 100. The signal processor 130 may process analysis results as image signals and display the analysis results on a display of the user interface 160. Also, the signal processor 130 may send a control signal to the illumination optical system 110 and the detection optical system 120 according to an input from the user interface 160. The signal processor 130 may be implemented as a microprocessor, etc.

The user interface 160 may include an input device and a display, and/or any other element that interfaces between the quantitative molecular sensing apparatus 100 and a user and/or another external apparatus.

A program for processing and control of the signal processor 130 and input/output data may be stored in the memory 150. In an exemplary embodiment, lookup table including correlations between average peak shift values and concentrations of target molecules over a predetermined time period, as shown in FIGS. 19 and 20, may be also stored in the memory 150 to be referenced in order to quantitatively determine a concentration of target molecules based on a Raman peak shift. Then, the signal processor 130 may determine a concentration of the target molecules in the object OBJ with reference to the lookup table stored in the memory 150.

The memory 150 may include at least one type of storage medium among a flash memory type, a hard disk type, a multimedia card micro type, card type memory (for example, Secure Digital (SD) or eXtreme Digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

In addition, the quantitative molecular sensing apparatus 100 may further include a communication device. For example, analysis results may be transmitted to an external apparatus through the communication device. The external apparatus may be medical equipment that uses analyzed bio-information, a printer for printing results, or a display for displaying analysis results. Also, the external apparatus may be a smart phone, a mobile phone, Personal Digital Assistant (PDA), a laptop computer, a Personal Computer (PC), a wearable device, or a mobile or non-mobile computing apparatus, although not limited to these.

The apparatus according to the current exemplary embodiments may include a processor, memory for storing program data, permanent storage such as a disk drive, a communication port communicating with an external apparatus, and a user interface, such as a touch panel, a key, a button, etc. The methods may be implemented as a software module or an algorithm and may be stored on non-transitory computer-readable recording medium as computer-readable codes or program commands executable on the processor. The computer-readable recording medium may be magnetic recording medium (for example, ROM, RAM, a floppy disc, a hard disc, etc.) or optical recording medium (for example, Compact Disc-Read Only Memory (CD-ROM), Digital Video Disc (DVD), etc.). However, the computer-readable recording medium may be distributed to computer systems over a network, in which computer-readable codes may be stored and executed in a distributed manner. The medium may be readable by a computer, stored in memory, and executed by a processor.

The quantitative molecular sensing apparatus 100 according to the current exemplary embodiment may accurately and quantitatively sense a concentration of biomolecules based on a Raman peak shift when target molecules are bound with linker molecules. Particularly, the quantitative molecular sensing apparatus 100 may analyze a concentration of target molecules quickly based on an average Raman peak shift rate for an initial time of a reaction, without having to wait until a reaction between linker molecules and target molecules reaches a chemical equilibrium state. Furthermore, according to the current exemplary embodiment, the quantitative molecular sensing apparatus 100 may use a sample as it is without having to process or treat the sample in order to measure a concentration of target molecules.

Apparatuses and methods for quantitative molecular sensing using Raman peak shift have been descried with reference to the exemplary embodiments shown in the drawings. However, the embodiments are only exemplary, and it will be understood by those skilled in that art that various modifications and other equivalent embodiments may be made from the above-described embodiments. Therefore, the disclosed embodiments should be considered from a descriptive standpoint rather than a restrictive standpoint. The scope of the present disclosure is defined in the accompanying claims rather than the above detailed description, and it should be noted that all differences falling within the claims and equivalents thereof are included in the scope of the present disclosure.

What is claimed is:

1. A quantitative molecular sensing apparatus comprising:
an illumination optical system comprising a light source configured to radiate excitation light onto an object that comprises a plurality of target molecules and a plurality of linker molecules, wherein each of the plurality of linker molecules is configured to bind to the plurality of target molecules;
a detection optical system comprising an optical detector configured to detect light scattered by the object; and
a signal processor configured to analyze a property of the object based on a signal output by the detection optical system and to calculate a concentration of the plurality of target molecules in the object based on a Raman peak shift value based on the plurality of target molecules being bound to the plurality of linker molecules over a predetermined time period.

2. The quantitative molecular sensing apparatus of claim 1, further comprising a Raman scattering substrate configured to support the object.

3. The quantitative molecular sensing apparatus of claim 2, wherein the Raman scattering substrate comprises a surface enhanced Raman scattering substrate.

4. The quantitative molecular sensing apparatus of claim 2, wherein the Raman scattering substrate comprises:
a support layer;
a plurality of metal nanoparticle clusters arranged on the support layer;
a plurality of holes disposed among the plurality of metal nanoparticle clusters, wherein each of the plurality of holes is configured to transmit light, incident on a top of the Raman scattering substrate, toward the support layer.

5. The quantitative molecular sensing apparatus of claim 4, wherein each metal nanoparticle cluster comprises a plurality of conductive metal nanoparticles stacked in a 3-dimensional structure.

6. The quantitative molecular sensing apparatus of claim 2, wherein the plurality of linker molecules are fixed on a surface of the Raman scattering substrate.

7. The quantitative molecular sensing apparatus of claim 1, wherein the signal processor is further configured to:
obtain a plurality of Raman spectra at regular time intervals based on the signal output by the detection optical system, and
process the plurality of Raman spectra using a signal processing technique.

8. The quantitative molecular sensing apparatus of claim 7, wherein the signal processing technique comprises:
applying a Savitzky-Golay filter and Gaussian fitting sequentially to the plurality of Raman spectra obtained at regular time intervals, and
applying a first-order Savitzky-Golay filter having a predetermined data frame length in a time domain to the plurality of Raman spectra.

9. The quantitative molecular sensing apparatus of claim 7, wherein the signal processor is further configured to:
calculate an average peak shift value over the predetermined time period based on the processed Raman spectra, and
calculate a concentration of the plurality of target molecules in the object based on the average peak shift value over the predetermined time period.

10. The quantitative molecular sensing apparatus of claim 7, further comprising:
a Raman scattering substrate, the plurality of linker molecules being fixed to the Raman scattering substrate; and
a timer configured to measure a time taken for the plurality of target molecules in the object to react with the plurality of linker molecules,
wherein the signal processor is further configured to detect the time measured by the timer.

11. The quantitative molecular sensing apparatus of claim 10, wherein the predetermined time period is a time period ending prior to a reaction between the plurality of target molecules and the plurality of linker molecules reaching a chemical equilibrium state and beginning after the reaction between the plurality of target molecules and the plurality of linker molecules begins.

12. The quantitative molecular sensing apparatus of claim 10, further comprising a memory storing therein a lookup table comprising correlations between average peak shift values and concentrations of the plurality of target molecules over the predetermined time period,
wherein the signal processor is further configured to determine the concentration of the plurality of target molecules in the object based on the lookup table stored in the memory.

13. The quantitative molecular sensing apparatus of claim 12, wherein the memory further stores therein data defining a difference between an average peak shift over the predetermined time period and a final Raman peak shift.

14. The quantitative molecular sensing apparatus of claim 13, wherein the signal processor is further configured to correct an error of the concentration of the plurality of target molecules in the object based on the data defining the difference between the average peak shift over the predetermined time period and the final Raman peak shift.

15. A quantitative molecular sensing method comprising:
irradiating an object with excitation light from an illumination optical system, the object comprising a plurality of target molecules and a plurality of linker molecules, wherein each of the plurality of linker molecules is configured to bind to the plurality of target molecules;
detecting light, scattered from the object, using a detection optical system;
obtaining a Raman spectrum using a signal output from the detection optical system; and
calculating a concentration of the plurality of target molecules in the object based on a Raman peak shift value based on the plurality of target molecules being bound to the plurality of linker molecules over a predetermined time period.

16. The quantitative molecular sensing method of claim 15, further comprising:
placing the object on a Raman scattering substrate, before irradiating the object with the excitation light.

17. The quantitative molecular sensing method of claim 16, wherein the Raman scattering substrate comprises the plurality of linker molecules fixed thereto.

18. The quantitative molecular sensing method of claim 15, wherein the obtaining of the Raman spectrum using the signal output from the detection optical system comprises obtaining a plurality of Raman spectra at regular time intervals.

19. The quantitative molecular sensing method of claim 18, further comprising:
processing the plurality of Raman spectra using at least one signal processing technique.

20. The quantitative molecular sensing method of claim 19, wherein the processing the plurality of Raman spectra comprises:
applying a Savitzky-Golay filter and Gaussian fitting sequentially to the plurality of Raman spectra obtained at regular time intervals, and
applying a first-order Savitzky-Golay filter having a predetermined data frame length in a time domain to the plurality of Raman spectra to which the Savitzky-Golay filter and the Gaussian fitting are applied.

21. The quantitative molecular sensing method of claim 20, wherein the calculating the concentration of the plurality of target molecules comprises:
calculating an average peak shift value over the predetermined time period based on the plurality of Raman spectra to which the first-order Savitzky-Golay filter is applied; and
calculating the concentration of the plurality of target molecules in the object based on the average peak shift value over the predetermined time period.

22. The quantitative molecular sensing method of claim 21, wherein the predetermined time period is a time period ending prior to a reaction between the plurality of target molecules in the object and the plurality of linker molecules on a Raman scattering substrate reaching a chemical equilibrium state and beginning after the reaction between the plurality of target molecules and the plurality of linker molecules begins.

23. The quantitative molecular sensing method of claim 21, wherein the calculating the concentration of the plurality of target molecules in the object based on the average peak shift value over the predetermined time period comprises referencing a lookup table comprising correlations between average peak shift values and concentrations of the plurality of target molecules over the predetermined time period.

24. The quantitative molecular sensing method of claim 23, wherein the calculating the concentration of the plurality of target molecules in the object based on the average peak shift value over the predetermined time period further comprises correcting an error of the concentration of the plurality of target molecules in the object based on data about a difference between an average peak shift over the predetermined time period and final Raman peak shift.

* * * * *